A. G. HAUMANN.
Shutter.
No. 8,118. Reissued March 12, 1878.
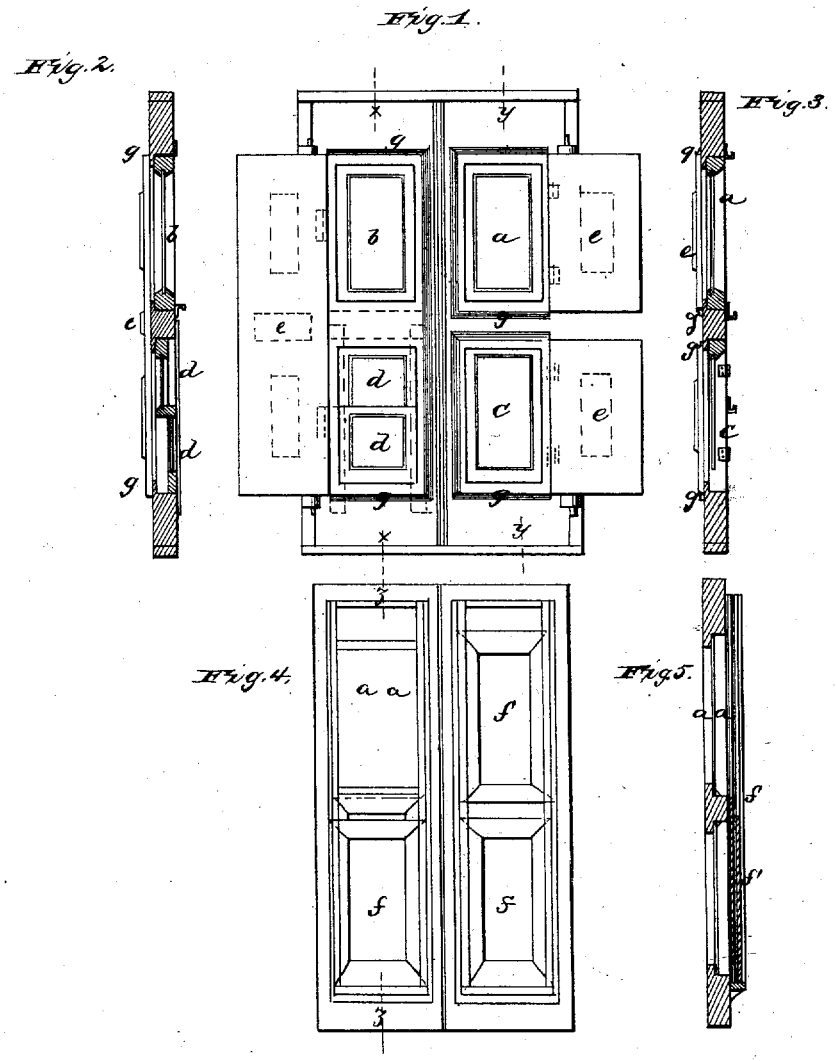
WITNESSES
Franck L. Ouvard
H. Aubiey, Toulmin
INVENTOR
August G. Haumann
Chandler Dueson
ATTORNEYS
N. PETERS, PHOTO-LITHOGRAPHER, WASHINGTON, D. C.

UNITED STATES PATENT OFFICE.

AUGUST G. HAUMANN, OF CHICAGO, ILLINOIS.

IMPROVEMENT IN SHUTTERS.

Specification forming part of Letters Patent No. 192,506, dated June 26, 1877; Reissue No. 8,118, dated March 12, 1878; application filed February 11, 1878.

*To all whom it may concern:*

Be it known that I, AUGUST G. HAUMANN, of Chicago, in the county of Cook and State of Illinois, have invented certain new and useful Improvements in Shutters; and I do hereby declare that the following is a full, clear, and exact description thereof, reference being had to the accompanying drawings, and to the letters of reference marked thereon, which form a part of this specification.

This invention relates to an improvement of shutters in general; and it consists in the construction of parts, as hereinafter set forth.

The inclemency of the Northern as well as of the Southern climate makes protection against the same desirable. The wind, frost, and snow will penetrate, no matter how well secured, the crevices of the window-frame in one instance; heat, dust, and rain in the other.

After a snow-storm or a thaw, snow or ice accumulates in front of the frame and on the seat of the shutter, and can often only be removed with difficulty, during which time the cold atmosphere will enter the comfortable apartment, or, after a heavy rain, the water has spoiled the carpets, tapestry, or goods by finding its way to the inside of the window-frame. To close the shutter permanently will exlude the air and light, or, if slatted, will not guard against outside incommodities.

The object of my invention now is to remove all these difficulties by constructing a shutter which can remain closed, creating thereby a non-conducting volume of air between the shutter and the window, and will allow at the same time the introduction of light, air, and ventilation, which can be shut off at any time, in any desirable way, without difficulty.

In the accompanying sheet of drawings, Figure 1 is a front view of my improved shutter, showing an outside main shutter closed, with outside sub-shutters open, uncovering the various panels, and their mode of fastening to the main shutter-frame. Fig. 2 is a section on line *x* of Fig. 1. Fig. 3 is a section on line *y* of Fig. 1. Fig. 4 is a rear view of an outside main shutter closed, with inside sub-shutters partly closed and partly open. Fig. 5 is a section through line *z* of Fig. 4.

Letter *a* represents a fixed panel of any known construction, (framed;) *a a*, a fixed panel, (not framed.) Letter *b* shows a frame hinged on top; letter *c*, one hinged on the side, and letter *d* a sliding frame of common glass, stained glass, mosquito-bars, transparent or other signs fastened in various ways to the main frame. Letters *e* and *f* represent sub-shutters, either hinged or sliding. Letter *g* represents a wooden strip on the main shutter, serving as seat for the sub-shutter.

My improved shutter, being substantially constructed as described, operates as follows: Each sub shutter or frame can be opened and closed independent of the other. Each frame can be fastened into the main frame in such a manner as to be easily taken out. When introduction of air is required the frame can be hinged or made to slide. When ventilation is needed, mosquito-bars can be inserted. Stained glass will have the desired effect in the sick-chamber, and the insertion of signs will accommodate both stores and offices. The strip *g* will serve as weather-strip and seat for the sub-shutter, thereby fitting the same snug to the main frame.

It is obvious from the foregoing description that my device can be used on all kinds of inside or outside shutters, and that the use of inside or outside sub-shutters depends on the selection or mode of arranging the frames.

Having thus described my invention, I claim—

1. A hinged window-shutter provided with one or more lighting or ventilating panels, and one or more sliding or hinged panels of known construction on the inside of the same, substantially as set forth.

2. A shutter consisting in the combination, with a shutter-frame, of one or more outer doors and one or more inner hinged or sliding panels, as set forth.

In testimony that I claim the foregoing I have hereunto set my hand this 12th day of December, 1877.

AUGUST G. HAUMANN.

Witnesses:
W. J. MEEK,
MATTHEW MEEK.